(12) United States Patent
Francis et al.

(10) Patent No.: US 7,300,123 B2
(45) Date of Patent: Nov. 27, 2007

(54) METHOD AND APPARATUS FOR A CONTAINER MANAGED PERSISTENT ENTITY BEAN SUPPORT ARCHITECTURE

(75) Inventors: Timothy Marc Francis, Keswick (CA); Arthur Thomas Jolin, Chapel Hill, NC (US); Yang Lei, Cary, NC (US); Lawrence Scott Rich, Cary, NC (US); Timo Juhani Salo, Cary, NC (US); Kevin Joe Williams, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 10/720,501

(22) Filed: Nov. 24, 2003

(65) Prior Publication Data

US 2005/0114835 A1   May 26, 2005

(51) Int. Cl.
*G06F 3/00* (2006.01)
(52) U.S. Cl. ...................................... 319/328

(58) Field of Classification Search ................ 719/328
See application file for complete search history.

(56) References Cited

U.S. PATENT DOCUMENTS

| 7,086,065 B1* | 8/2006 | Yeluripati et al. .......... 719/311 |
| 2002/0004850 A1* | 1/2002 | Sudarshan et al. .......... 709/313 |
| 2003/0182307 A1* | 9/2003 | Chen et al. ............. 707/103 X |

* cited by examiner

*Primary Examiner*—William Thomson
*Assistant Examiner*—LeChi Truong
(74) *Attorney, Agent, or Firm*—Duke W. Yee; A. Bruce Clay; Gerald H. Glanzman

(57) ABSTRACT

The present invention provides methods, apparatus and computer instructions for a container managed persistent support architecture that meets the Enterprise Java Bean (EJB) Specification. The support architecture provides application programmers a model for balancing generated components with runtime code to better optimize flexibility and efficiency of applications. Six generated components: concrete bean, bean adaptor binding, injector, extractor, data cache entry and function set, are used in combination with runtime code to perform typical operations of CMP entity beans.

1 Claim, 13 Drawing Sheets

```
800
public BankKey ejbFindByPrimaryKey(
        java.lang.Integer arg0)
        throws javax.ejb.FinderException{
        return (BankKey) instanceExtension.FindByPrimaryKey(arg0);
}
```

```
public class ConcreteCustomerEJB_4fb7b8ee    /─ 900
        extends com.ibm.ws.pmtest.model.base.CustomerBean   /─ 902
        implements javax.cjb.EntityBean, ConcreteBeanWithMMLink {
/**
 * @generated
 */
private ConcreteBeanInstanceExtension instanceExtension;   /─ 904
/**
        *ConcreteCustomerEJB_4fb7b8cc
        * @generated
        */
        public ConcreteCustomerEJB_4fb7b8ee() {
                super();
                instanceExtension
                        ConcreteBeanInstanceExtensionFactory.getInstance(this);
        }
/**
        * ejbRemove
        * @generated
        */
        public void ejbRemove() throws javax.ejb.RemoveException {   /─ 906
                super.ejbRemove();
                instanceExtension.ejbRemove();
        }
/**
        * ejbStore
        * @generated
        */
        public void ejbStore() {   /─ 908
                super.ejbStore();   /─ 920
                instanceExtension.ejbStore();   /─ 922
        }

/**
        * ejbFindByPrimaryKey
        * @generated
        */
        public java.lang.Integer ejbFindByPrimaryKey(java.lang.Integer arg0)   /─ 910
                throws javax.ejb.FinderException {
                return (java.lang.Integer) instanceExtension.ejbFindByPrimaryKey(arg0);
        }
/**
        * ejbCreate
        * @generated
        */
        public.java.lang.Integer ejbCreate(   /─ 912
                java.lang.Integer arg0,
                java.lang.String arg1)
                throws javax.ejb.CreateException {
                super.ejbCreate(arg0, arg1);
                return (java.lang.Integer) instanceExtension.ejbCreate();
        }
}
```

*FIG. 9*

```
public class CustomerAdaptorBinding
        implements com.ibm.ws.ejbpersistence.beanextensions.BeanAdaptorBinding {
    /**
     * getExtractor
     * @generated
     */
    public com.ibm.ws.ejbpersistence.dataaccess.EJBExtractor getExtractor() {
        int beanChunkLength = 2;
        // extractor for
com.ibm.ws.pmtest.model.base.websphere_deploy.DB2UDBNT_V72_1.CustomerExtractor
        com.ibm.ws.ejbpersistence.dataaccess.AbstractEJBExtractor extractor =
                new com.ibm.ws.pmtest.model.base.websphere_deploy.DB2UDBNT_V72_1
                        .CustomerExtractor();
        extractor.setChunkLength(beanChunkLength);
        extractor.setPrimaryKeyColumns(new int[] { 2 });
        extractor.setDataColumns(new int[] {1, 2});
        return extractor;
    }
    /**
     * getInjector
     * @generated
     */
    public com.ibm.ws.ejbpersistence.beanextensions.EJBInjector getInjector() {
        return new com.ibm.ws.pmtest.model.base.websphere_deploy.DB2UDBNT_V72_1
                .CustomerInjectorImpl();
    }
    /**
     * createDataAccessSpecs
     * @generated
     */
    public java.util.Collection createDataAccessSpecs()
            throws javax.resource.ResourceException {
        com.ibm.ws.ejbpersistence.beanextensions.EJBDataAccessSpec daSpec;
        com.ibm.ws.rsadapter.cci.WSInteractionSpecImpl iSpec;
        java.util.Collection result = new java.util.ArrayList(15);

daSpec =
                com
                    .ibm
                    .ws
                    .ejbpersistence
                    .beanextensions
                    .DataAccessSpecFactory
                    .getDataAccessSpec();
        iSpec = new com.ibm.ws.rsadapter.cci.WSInteractionSpecImpl();
        iSpec.setFunctionSetName(
                "com.ibm.ws.pmtest.model.base.websphere_deploy.DB2UDBNT_V72_1
CustomerFunctionSet");
        iSpec.setFunctionName("Create");
        daSpec.setInteractionSpec(iSpec);
        daSpec.setSpecName("Create");
        daSpec.setInputRecordName("Create");
        daSpec.setOptimistic(false);
        daSpec.setType(
                com
                    .ibm
                    .ws
                    .ejbpersistence
                    .beanextensions
                    .EJBDataAccessSpec
                    .CREATE_BEAN);
        daSpec.setQueryScope(new String[] { "Customer" });
        result.add(daSpec);
    }
}
```

FIG. 10

```
public class CustomerInjectorImpl  /—1100
    implements com.ibm.ws.pmtest.model.base.websphere_deploy.CustomerBeanInjector {
    /**
    * ejbCreate
    * @generated
    */
    public void ejbCreate(  /—1102
        com.ibm.ws.ejbpersistence.beanextensions.ConcreteBean cb,
        javax.resource.cci.IndexedRecord record( {
        com.ibm.ws.pmtest.model.base.ConcreteCustomerEJB_4fb7b8ee concreteBean =
            (com.ibm.ws.pmtest.model.base.ConcreteCustomerEJB_4fb7b8ee) cb;
        record.set(0, concreteBean.getName());  ~—1110
        record.set(1, concreteBean.getId());  ~—1112
    }
    /**
    * ejbStore
    * @generated
    */
    public void ejbStore(  /—1104
        com.ibm.ws.ejbpersistence.beanextensions.ConcreteBean cb,
        javax.resource.cci.IndexedRecord record) {
        com.ibm.ws.pmtest.model.base.ConcreteCustomerEJB_4fb7b8ee concreteBean =
            (com.ibm.ws.pmtest.model.base.ConcreteCustomerEJB_4fb7b8ee) cb;
        record.set(0, concreteBean.getName());
        record.set(1, concreteBean.getId());
    }
    /**
    * ejbRemove
    * @generated
    */
    public void ejbRemove(  /—1106
        com.ibm.ws.ejbpersistence.beanextension.ConcreteBean.cb,
        javax.resource.cci.IndexedRecord record) {
        com.ibm.ws.pmtest.model.base.ConcreteCustomerEJB_4fb7b8ee concreteBean =
            (com.ibm.ws.pmtest.model.base.ConcreteCustomerEJB_4fb7b8ee) cb;
        record.set(1, concreteBean.getId());
    }
    /**
    *ejbFindByPrimaryKey
    * @generated
    */
    public void ejbFindByPrimaryKey(  /—1108
        Object pkeyObject,
        javax.resource.cci.IndexedRecord record) {
        java.lang.Integer pkey - (java.lang.Integer) pkeyObject;
        record.set(0, pkey);
    }
}
```

*FIG. 11*

```
public class CustomerExtractor ─╱─1200
        extends com.ibm.ws.ejbpersistence.dataaccess.AbstractEJBExtractor {
    /**
     * CustomerExtractor
     * @generated
     */
    public CustomerExtractor() {
            int[] pkCols = { 2 };
            setPrimaryKeyColumns(pkCols);

int[] dataCols = { 1,2,3 };
            setDataColumns(dataCols);
    }
    /**
     * extractData
     * @generated
     */
    public com.ibm.ws.ejbpersistence.cache.DataCacheEntry extractData( ─╱─1202
            com.ibm.ws.ejbpersistence.dataaccess.RawBeanData dataRow)
            throws
                    com.ibm.ws.ejbpersistence.utilpm.ErrorProcessingResultCollectionRow,
                    com.ibm.ws.ejbpersistence.utilpm.PersistenceManagerInternalError {
            int[] dataColumns = getDataColumns();

com.ibm.ws.pmtest.model.base.websphere_deploy.DB2UDBNT_V72_1
                    .CustomerCacheEntryImpl entry =
                    new com
                            .ibm
                            .ws
                            .pmtest
                            .model
                            .base
                            :websphere_deploy
                            .DB2uDBNT_V72_1
                            .CustomerCacheEntryImpl(); ─╱─1204 entry.setDataForNAME(dataRow.getString(dataColumns[0]));
            entry.setDataForID(dataRow.getInt(dataColumns[1]), dataRow.wasNull());

return entry;
    }
    /**
     * extractPrimaryKey
     * @generated
     */
    public Object extractPrimaryKey( ─╱─1206
            com.ibm.ws.ejbpersistence.dataaccess.RawBeanData dataRow)
            throws
                    com.ibm.ws.ejbpersistence.utilpm.ErrorProcessingResultCollectionRow,
                    com.ibm.ws.ejbpersistence.utilpm.PersistenceManagerInternalError {
            int[] primaryKeyColumns = getPrimaryKeyColumns();

java.lang.Integer key;
            key new Integer(dataRow.getInt(primaryKeyColumns[0]));

return key;
}
```

*FIG. 12*

```
public class CustomerCacheEntryImpl  /—1300
        extends com.ibm.ws.ejbpersistence.cache.DataCacheEntry
        implements com.ibm.ws.pmtest.model.base.websphere_deploy.CustomerBeanCacheEntry {
    /**
     * @generated
     */
    private String NAME_Data;
    /**
     * @generated
     */
    private int ID_Data;
    /**
     * @generated
     */
    private boolean ID_IsNull;
    /**
     * getName
     * @generated
     */
    public java.lang.String getName() {  /—1304
            return NAME_Data;
    }
    /**
     * setDataForNAME
     * @generated
     */
    public void setDataForNAME(String data) {  /—1308
            this.NAME_Data=data;
    }
    /**
     * getId
     * @generated
     */
    public java.lang.Integer getId() {  /—1306
            if(ID_IsNull)
                    return null;
            else
                    return new Integer(ID_Data);
    }
    /**
     * setDataForID
     * @generated
     */
    public void setDataForID(int data, boolean isNull) {  ~1310
            this.ID_Data = data;
            this.ID_IsNull - isNull;
    }
}
```

*FIG. 13*

```
public class CustomerFunctionSet ── 1400
        extends com.ibm.ws.rsadapter.cci.WSResourceAdapterBase
        implements com.ibm.websphere.rsadapter.DataAccessFunctionSet {
    /**
     * @generated
     */
    private java.util.HashMap functionHash; ── 1404
    /**
     * Create
     * @generated
     */
    public void Create( ── 1402
            IndexedRecord inputRecord,
            Object connection,
            WSInteractionSpec interactionSpec)
            throws DataStoreAdapterException {
        PreparedStatement pstmt = null;
        try {
            pstmt =
                    prepareStatement(
                            connection,
                            "INSERT INTO CUSTOMEREJB (ID, NAME) VALUES (?, ?)");
            //For column NAME
            {
                String tempString;

tempString = (String) inputRecord.get(0);
                if(tempString == null)
                        pstmt.setNull(2, java.sql.Types.VARCHAR);
                else
                        pstmt.setString(2, tempString);
            }
            //For column ID
            {
                Integer tempInteger;

tempInteger = (Integer) inputRecord.get(1);
                if(tempInteger == null)
                        pstmt.setNull(1, java.sql.Types.INTEGER);
                else
                        pstmt.setInt(1, tempInteger.intValue());
            }
            if (pstmt.executeUpdate() == 0)
                    throw new DataStoreAdapterException(
                            "DSA_ERROR",
                            new javax.ejb.NoSuchEntityException(),
                            this.getClass());

} catch (SQLException e) {
            throw new DataStoreAdapterException(
                    "DSA_ERROR",
                    c,
                    this.getClass());
        } finally {
```

*FIG. 14A*

```
/**
 * CustomerFunctionSet
 * @generated
 */
public CustomerFunctionSet() {
    1406⟋ functionHash = new java.util.HashMap(15);

functionHash.put("Create", new Integer(0));
            functionHash.put("Remove", new Integer(1));
            functionHash.put("Store", new Integer(2));
            functionHash.put("StoreUsingOCC", new Integer(3));
            functionHash.put("FindByName", new Integer(4));
            functionHash.put("FindByNameForUpdate", new Integer(5));
            functionHash.put("FindByPrimaryKey", new Integer(6));
            functionHash.put("FindByPrimaryKeyForUpdate", new Integer(7));
            functionHash.put("ejbSelectAllNames", new Integer(8));        ⎫1408
            functionHash.put("ejbSelectCustomersNamed", new Integer(9));
            functionHash.put("ejbSelectCustomersNamedForUpdate", newInteger(10));
            functionHash.put("findCustomersByAliasesKey_Local", new Integer(11));
            functionHash.put(
                    "findCustomersByAliasesKey_LocalForUpdate",
                    new Integer(12));
            functionHash.put("CreateCustomersAliasesTuple", new Integer(13));
            functionHash.put("RemoveCustomersAliasesTuple", new Integer(14));
}
/**
 * execute
 * @generated
 */
public Record execute(⟋1410
        WSInteractionSpec interactionSpec,
        IndexedRecord inputRecord,
        Object connection)
        throws javax.resource.ResourceException {
    String functionName = interactionSpec.getFunctionName();
    Record outputRecord = null;
    int functionIndex =
            ((Integer) functionHash.get(functionName)).intValue();
    switch (functionIndex) {
        case 0:
                Create(inputRecord, connection, interactionSpec);
                break;
        case 1:
                Remove(inputRecord, connection, interactionSpec);
                break;
        case 2:
                Store(inputRecord, connection, interactionSpec);
                break;
        case 3:
                StoreUsingOCC(inputRecord, connection, interactionSpec);
                break;
        case 4:
                outputRecord=
                        FindByName(inputRecord, connection, interactionSpec);
                break;
```

*FIG. 14B*

METHOD AND APPARATUS FOR A CONTAINER MANAGED PERSISTENT ENTITY BEAN SUPPORT ARCHITECTURE

BACKGROUND OF THE INVENTION

1. Technical Field

The present invention relates generally to an improved data processing system and in particular to a method and apparatus for processing data. Still more particularly, the present invention relates to a method, apparatus, and computer instructions for supporting container managed persistent entity bean for a Java programming system.

2. Description of Related Art

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web. The Java virtual machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

In Java, independent Java program modules that are called for and executed are referred to as JavaBeans. JavaBeans have been primarily used for developing user interface on the client side. A server side counterpart of JavaBeans is present. This counterpart is referred to as Enterprise JavaBeans (EJBs). An EJB is a software component in Java 2, Enterprise Edition (J2EE) Platform. This platform provides a pure Java environment for developing and running distributed applications. EJBs are written as software modules that contain the business logic of the application. These EJBs reside in and are executed in a runtime environment called an "EJB container", which provides common interfaces and services to the EJB. These services include security and transaction support.

Container-managed persistent (CMP) entity EJBs are in essence wrappers for persistent data with additional support for transaction control and security. The persistent data typically takes the form of relational databases. The EJB specification, version 2.0 specification, defines a high-level interface for various types of web-based application services. One of the most complex of these types of services is a container-managed persistent (CMP) entity bean. A CMP entity bean represents a unit of data held in a persistent data store, but which the end user may treat as a Java object. In these examples, the end user is typically an applications programmer. An applications server provider provides a mechanism in the form of code to implement the EJB specification for CMP entity beans and forms a bridge between the interfaces seen by the application programmer and various persistent data stores.

The EJB specification for CMP entity beans leaves an extreme degree of latitude in how the mechanism for this function actually is implemented. At the same time, there are distinct advantages in a mechanism that can be flexible in dealing with the various ways CMP beans can be used and is efficient both in speed and use of memory and other system resources. Some of the ways in which CMP beans may be used include, for example, allowing the applications programmer to be free to define any number of CMP beans of different types, each type representing some aspect of an object model. For example, bank beans, customer beans, bank account beans, and account transaction beans are CMP beans that may be defined. Each CMP bean type has aspects that are specific to that bean type and aspects that are common among the bean types. The particular data store and table of data within the data store may vary from bean type to bean type. The general mechanism, however, for communicating with the data store and the operations performed on the bean are common. These operations include, for example, create, read, update, and delete a CMP bean. Another way in which a CMP bean may be used is to have a CMP bean inherit from another. Further, CMP beans may have associations with one another. For example, a bank CMP bean may have many customer CMP beans. Further, it is advantageous to allow a change to a different data store with a minimal impact on the applications programmer and their work in defining bean types. Further, it is also advantageous to allow changes to the mechanism with minimal impact on the applications programmer and their work defining the bean types.

The fact that each CMP bean type has aspects specific to it means that some amount of generated code is likely to be present as part of a mechanism for CMP beans. These different aspects that may be specific to a CMP bean include, for example, the name of the CMP bean and the name and type of attributes for the CMP bean. A mechanism may be designed with minimal generated information for a bean and the balance being commonly shared runtime code. An example of such a bean is a CMP bean that only contains a group of string constants. Alternatively, a mechanism also may be designed with one hundred percent generated code for each CMP bean with no shared runtime code. Between these two extremes are a nearly infinite number of possible design variations. Each variation may be better or worse than others in the key measures of flexibility and efficiency. Currently, a mechanism for achieving an optimum between flexibility and efficiency is unavailable. Therefore, it would be advantageous to have an improved method, apparatus, and computer instructions for a CMP entity bean support architecture that provides a better balance between generated and runtime code in order to optimize performance.

SUMMARY OF THE INVENTION

The present invention provides methods, apparatus and computer instructions for a container managed persistent support architecture that meets the Enterprise Java Bean Specification, available from Sun Microsystems, Inc. The support architecture of the present invention better optimizes flexibility and efficiency of an application by providing a balance between generated code and runtime code. Common operations of CMP entity beans, such as create, store, remove and find a bean, are performed by a combination of generated code and runtime code.

The support architecture includes six generated components: concrete bean, bean adapter binding, injector, extractor, data cache entry and function set. These generated components interact with runtime code to perform minimum functions consistent with efficiency.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a diagram illustrating an example implementation of a generated concrete bean in accordance with a preferred embodiment of the present invention;

FIG. 10 is a diagram illustrating an example implementation of a generated bean adaptor binding in accordance with a preferred embodiment of the present invention;

FIG. 11 is a diagram illustrating an example implementation of a generated bean adaptor in accordance with a preferred embodiment of the present invention;

FIG. 12 is a diagram illustrating an example implementation of a generated injector in accordance with a preferred embodiment of the present invention;

FIG. 13 is a diagram illustrating an example implementation of a generated data cache in accordance with a preferred embodiment of the present invention;

FIG. 14A is a diagram illustrating an example implementation of a generated function set in accordance with a preferred embodiment of the present invention; and FIG. 14B is a diagram illustrating an example implementation of generated function set in accordance with a preferred embodiment of the present invention.

DETAILED DESCRIPTION OF THE PREFERRED EMBODIMENT

Figure 1:
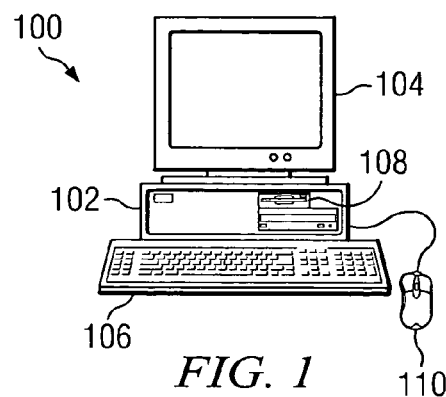
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
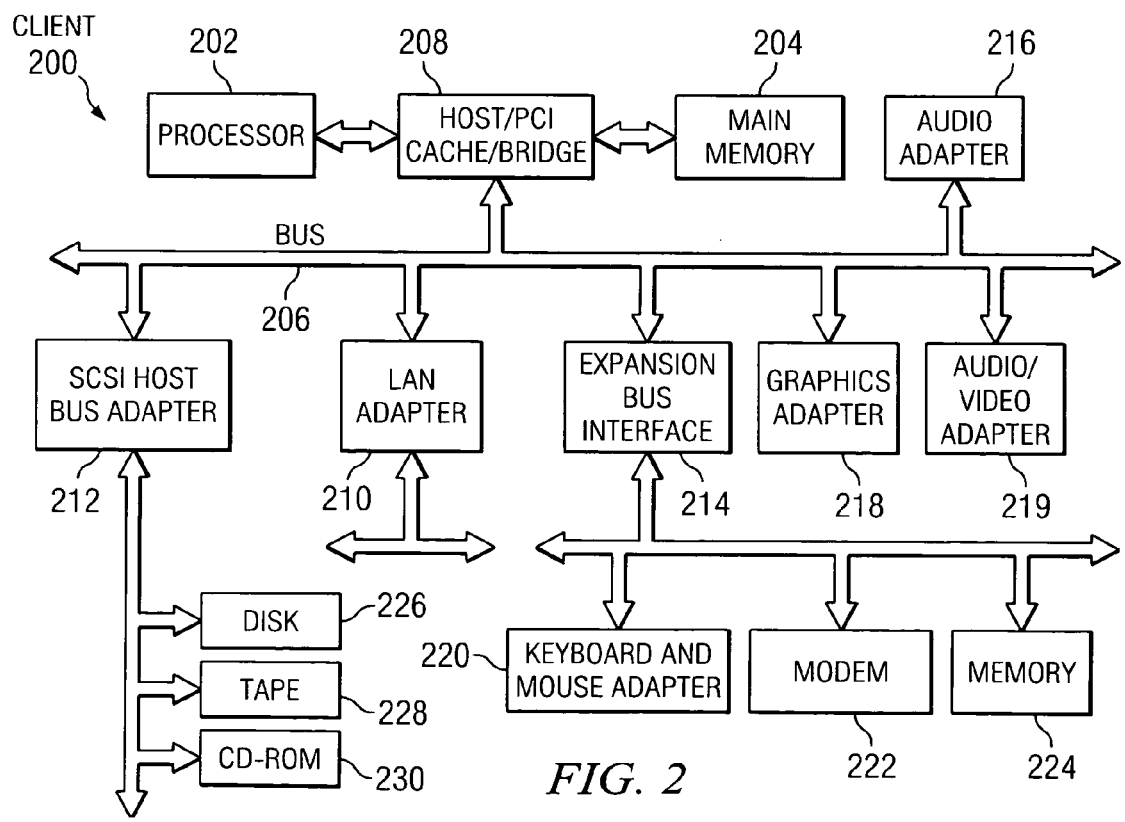
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides an improved method, apparatus, and computer instructions for a container managed persistent entity bean support architecture that meets the EJB Specification. The mechanism of the present invention provides application programmer a model that maintains a balance between generated code for each bean type and shared runtime code in a manner that optimizes flexibility and efficiency. The generated code is divided into several components, Java classes, each with a specific function. The performance of these functions is orchestrated through runtime code. The generated code is primarily used to perform bean-specific functions in an efficient manner.

Figures 3, 8:
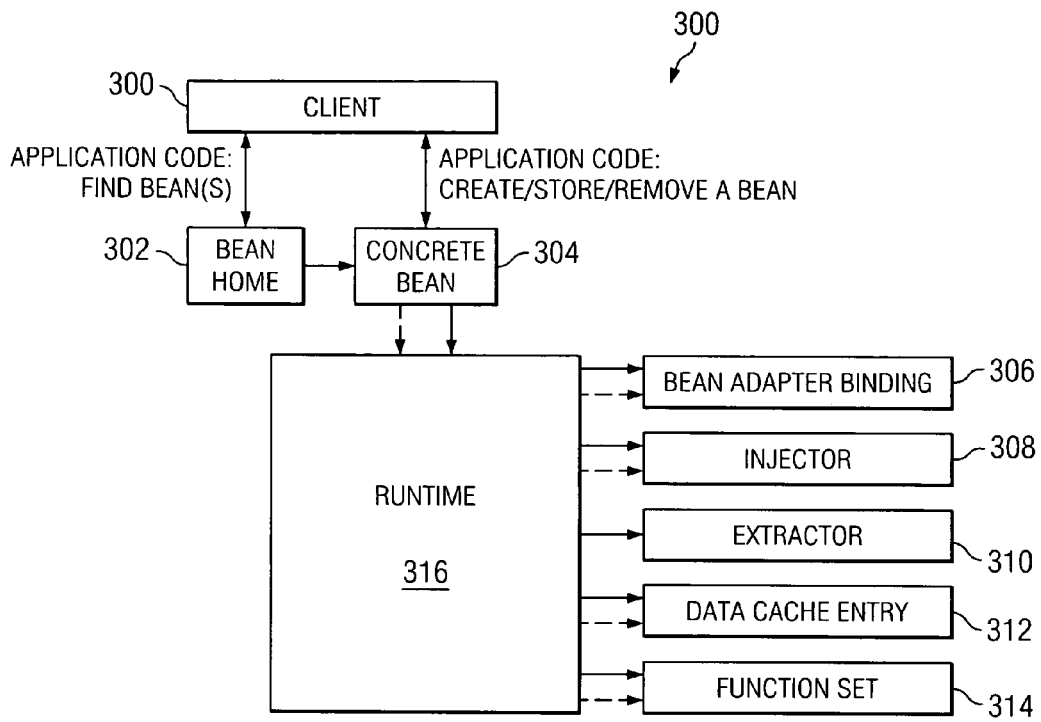
FIG. 3 is a diagram illustrating exemplary components in a CMP entity bean support architecture in accordance with a preferred embodiment of the present invention.
FIG. 8 is a diagram illustrating an example implementation of a generated method for concrete bean in accordance with a preferred embodiment of the present invention.

With reference to FIG. 3, a diagram illustrating exemplary components in a CMP entity bean support architecture is depicted in accordance with a preferred embodiment of the present invention. As illustrated, an example CMP entity bean support architecture includes concrete bean 304, bean adapter binding 306, injector 308, extractor 310, data cache entry 312, function set 314, and runtime 316. The generated components, concrete bean 304, bean adapter binding 306, injector 308, extractor 310, data cache entry 312, and function set 314, are unique for each bean type. The names of the generated components include the bean name itself. For example, the extractor for the "bank" bean is named "bankExtractor". These components provide a balance between generated code and runtime code.

When client 300 makes a request to find a bean that meets specific criteria, for example, a bank account bean with account balance of $10000 or above, the client looks up the "bank account" bean home using JNDI, a general-purpose Java lookup mechanism, and invokes methods on bean home 302. Bean home 302 calls methods on concrete bean 304, which includes an implementation of bean-specific methods that apply to bean type. These methods include, for example, find a bean or beans and create a bean. On return from these methods client 300 has indirect access to one or more concrete beans 304.

When client 300 makes a request to remove or update a bean of a specific bean type, for example, a bank account bean for customer John Doe, client 300 calls methods on concrete bean 304. Concrete bean 304 begins with the implementation of bean-specific methods that apply to bean instance. An example is update an attribute of this bean or delete this bean.

Bean adapter binding 306 is a primary source of bean-specific information at runtime. Injector 308 manages input parameters for the different bean methods. Extractor 310 processes the result of the bean finders. Bean finders are finder methods used to find a bean. Data cache entry 312 represents bean data either currently in use or cached for future use. Function set 314 interfaces most closely with the data store to persist the beans. Runtime 316 contains runtime code, which has no bean-specific code or information, and thus works for all bean types. This type of code is used because runtime code may be more flexibly fixed and enhanced with minimum impact for an applications developer. Less generated code and more runtime code also reduces the overall footprint of an application and its beans by reducing the size of components generated for each bean in exchange for increasing the size of the single copy of runtime components for all of the beans.

The abstract entity bean classes, which are inherited by concrete bean 304 classes, include method signatures for the specific type of bean, as defined in the EJB specification. The implementation of these methods, however, consists of calls to other generated components and runtime components. Concrete bean 304 is a concrete subclass of an abstract entity bean supplied by the bean provider. Concrete bean 304 implements the methods of the abstract entity bean. The implementation of concrete bean 304 realizes the abstract persistent schema as defined in the deployment descriptor. The abstract persistent schema allows a bean provider to define relationships between CMP entity beans, also known as container-managed relationships. For example, a group of related entity beans, such as order, lineItem and customer, may be defined as having a one-to-one, one-to-many or many-to-many relationships. The responsibility of concrete bean 304 may be broken down into two component responsibilities. One responsibility involves realizing the abstract entity bean, and the other responsibility involves implementing the persistent lifecycle management of the CMP bean. Realizing the bean provider's abstract entity bean and fulfilling the requirements of the specification requires a concrete implementation of all CMP and CMR fields as defined in the abstract persistent schema.

The CMP fields defined in the abstract persistent schema are container-managed persistent fields for a given bean instance. Each CMP field is implemented as a private attribute of concrete bean 304 with the corresponding get and set methods. An alternative implementation is for concrete bean to hold a data cache entry whose attributes are the CMP fields for this bean type. The set methods also provide a means for tracking "dirtiness", meaning whether a bean's field's value has been updated.

The CMR fields defined in the abstract persistent schema are relationships between related group of entity beans, for example, one-to-one, one-to-many, or many-to-many. Likewise, each container-managed relationship (CMR) field is implemented as a private attribute and is assigned an appropriate link instance to manage the relationship. This link instance is, for example, an association object. All operations directed to the CMR field are delegated to the link instance. The persistent-lifecycle management performed by concrete bean 304 includes the implementation of EJB 2.0 required methods. These methods include, for example, ejbFindByPrimaryKey (other finders are optional), ejbCreate, ejbStore, ejbRemove, and ejbSelect methods.

Providing the implementation of these methods requires collaboration with the "Data Access framework" runtime code. The "Data Access Framework", used in these illustrative examples, is an example runtime code implementation in the Websphere Application Server, a product available from International Business Machines Corporation. The "Data Access Framework" takes a request from a bean and converts to a unique identified function, along with a list of individual parameters of the function, and passes to Data Access components that perform functions such as security checking, connection to database, updates to database, etc. The generalized approach for these methods is to gather the required input data and delegate the behavior to the Data Access framework. Lifecycle management by concrete bean 304 also includes the hydration of concrete bean 304. Hydration, as used herein, involves retrieving the appropriate data cache entry from a cache managed by the persistence manager. The persistence manager is part of runtime code.

The persistence manager is part of the EJB 2.0 specification and handles persistence of CMP entity beans automatically at runtime. The persistence manager is responsible for mapping the entity bean to the database based on a bean-persistence manager contract called the abstract persistence schema. Further, the persistence manager is responsible for implementing and executing find methods based on a query language which is called EJB QL. This data retrieved from the persistence manager's cache is used to initialize the corresponding CMP and CMR fields. The data could have been retrieved from the database immediately prior to use or it could have been retrieved at an earlier time.

In these illustrative examples, concrete beans, such as concrete bean 304, must inherit from the bean provider's abstract beans. As a result, concrete bean 304 may not have an inheritance hierarchy of its own. Even with this limitation, a fair amount of infrastructure related technical behavior that all concrete beans have in common is present and these types of beans benefit from inheriting this technical behavior. In this case, where inheritance cannot be used, the common behavior is provided to concrete beans through delegation. Therefore, each concrete bean, such as concrete bean 304, holds an instance extension, runtime code, to which all common runtime behavior is delegated. This extension includes instance level state management, deferred update responsibilities, intent related behavior, class level meta information, various cached helper objects, and interfacing with other persistence manager (PM) subsystems. Helper objects include, for example, data access specs, extractors, and the connection factory.

Bean adapter binding 306 provides a backend plug ability to access bean specific information found in a data structure, such as a database. To achieve this backend plug ability, concrete bean 304 is configured by a generated ConcreteBeanAdapterBinding class whose specific implementation is specific to one backend. This backend is, for example, one particular database. Bean adapter binding 306 is a class that implements the four methods from ConcreteBeanAdapterBinding. These methods include getInjector, getExtractor, createDataAcessSpecs, and getAdapter. GetInjector returns the backend specific injector instance which implements this concrete bean's injector interface. GetExtractor is used to return the backend extractor instance. An extractor, such as extractor 310, is one of the components of the CMP entity bean support architecture. The Extractor handles the result of beans returned from the backend by converting a set of bean data to data format held by the concrete bean. CreateDataAccessSpecs returns a collection of DataAccessSpec definitions. CreateDataAccessSpecs packages methods from the concrete bean into a format that runtime code can handle. GetAdapter returns the runtime EJBToRAAdapter instance that acts as an adapter between the runtime persistence manager and the CCI RA. These are two separate parts of runtime code.

Injector 308 includes a method for each lifecycle, ejbStore/ejbRemove/ejbCreate<> and finder method on its concrete bean. Each of these methods is used to convert input parameters from the shape as viewed by the bean to the shape and layout (in an IndexedRecord) as expected by the function in Function Set 314 that will use the parameters.

The construction and initialization of Injector subclasses for Injector 308 for use at runtime is performed at concrete bean installation time, which is performed by runtime code. This construction and initialization occurs each time a Java Virtual Machine running an application, such as WebSphere Application Server, is started. WebSphere Application Server is a product available from International Business Machines Corporation. The code to perform this construction and initialization is generated code in these illustrative examples. This generated code implements the method "InjectorBeanAdapterBinding.getInjector( )", which is called by runtime code at the appropriate time.

With respect to extractors, such as extractor 310, a deployment tool generates a subclass of the supplied AbstractEJBExtractor class, which is runtime code. Additionally, the deployment tool also generates code to construct and initialize instances of this subclass. The construction and initialization is generated as specified by information from the bean provider. With some exceptions, this process results in one AbstractEJBExtractor subclass for each concrete bean class. The generated code provides the primary key of bean data, the subtype if part of an inheritance hierarchy of the bean data, and converts the bean data in its backend form into a DataCacheEntry subclass for the bean type.

The construction and initialization of AbstractEJBExtractor subclasses for use at runtime is performed at concrete bean installation time in the manner described above. The code in this illustrative example is generated code and is an implementation of the method "EJBExtractorBeanAdapterBinding.getExtractor( )". This method is called by the runtime code at an appropriate time. This method returns an instance of extractor 310, which can then later (at appropriate times) take a set of data from the database and converts the data to data format held by the concrete bean, in the form of Data cache entry 312.

Data cache entry 312 holds data for a given bean instance. This data is held in the form of Java primitive values and object references. Data cache entry 312 performs foreign-key handling in support of association, also known as container-managed relationships, between different beans. Further, an instance of the bean-specific cache entry subclass is created by extractor 310 at the request of runtime 316. This bean-specific cache entry subclass is stored in the persistence manager cache, by runtime code. Data cache entry 312 also implements methods defined by the runtime parent class DataCacheEntry.

Function set 314 contains a method for each operation on the backend of a datastore. These methods include, for example, FindByPrimaryKey, FindByPrimaryKeyForUpdate, Create, Store, StoreForOCC. For similar operations functions, such as FindByPrimaryKey and FindByPrimaryKeyForUpdate, the runtime code in runtime 316 determines which operation is executed based on runtime user intentions. For example, when a user wants to find a bean by primary key with no intention to update it, runtime 316 invokes corresponding findByPrimaryKey method of function set 314. The generated code in these methods use a connection obtained by runtime 316 to execute backend-specific, bean-specific data access logic. This logic includes, for example, execute SQL, call a stored procedure, or invoke a CICS function.

An example of data access logic is to insert an id and name of a "bank account" bean instance into a DB2 database. The generated code prepares the SQL statement necessary specific to DB2 to insert the data.

Figure 4:
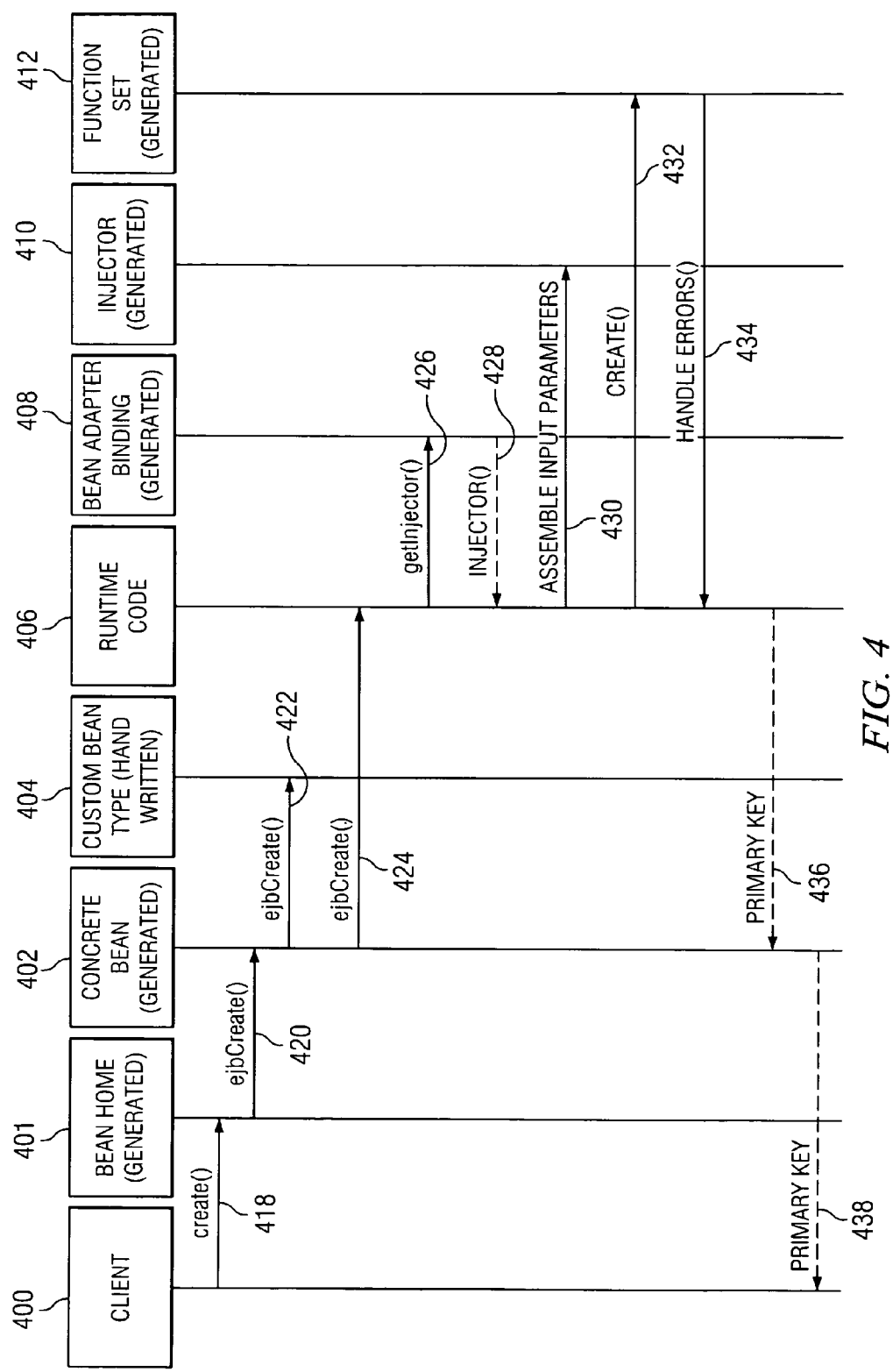
FIG. 4 is a diagram illustrating flow control for creating a bean using support architecture in accordance with a preferred embodiment of the present invention.

Turning next to FIG. 4, a diagram illustrating flow control for creating a bean using support architecture is depicted in accordance with a preferred embodiment of the present invention.

As shown in FIG. 4, when client 400 wants to create a bean, client 400 first calls 'create' method (call 418) of bean home 401. 'create' method of bean home 401 (call 418) calls 'ejbCreate' method of concrete bean 402 (call 420). The 'ejbCreate' method is specified in the EJB Specification as a required method provided by the bean provider. Concrete Bean 402 is generated. In turn, concrete bean 402 calls 'ejbCreate' method of custom bean type 404 (call 422). An example of custom bean type is a bank account bean. Custom bean type 404, if present, is hand written by the bean provider and is required as part of the EJB Specification. When finished, control returns to concrete bean 502.

Next, concrete bean 402 launches the 'ejbCreate' method of runtime code 406 (call 424). Runtime code 406 first creates an instance of Injector by calling Bean Adaptor Binding's 408 'getInjector' method (call 426). Once the injector instance 428 is created, runtime code 406 calls injector 410 to assemble input parameters 430. Runtime code 406 then calls the 'create' method of function set 412 to create the bean data in the data store (call 432).

When the bean data is created, if an error occurs, runtime code 406 handles the error 434 accordingly. If no error is encountered, runtime code 406 returns the primary key 436 that corresponds to the newly created bean to concrete bean 402. In turn, concrete bean 402 returns primary key 438 to client 400.

Figure 5:
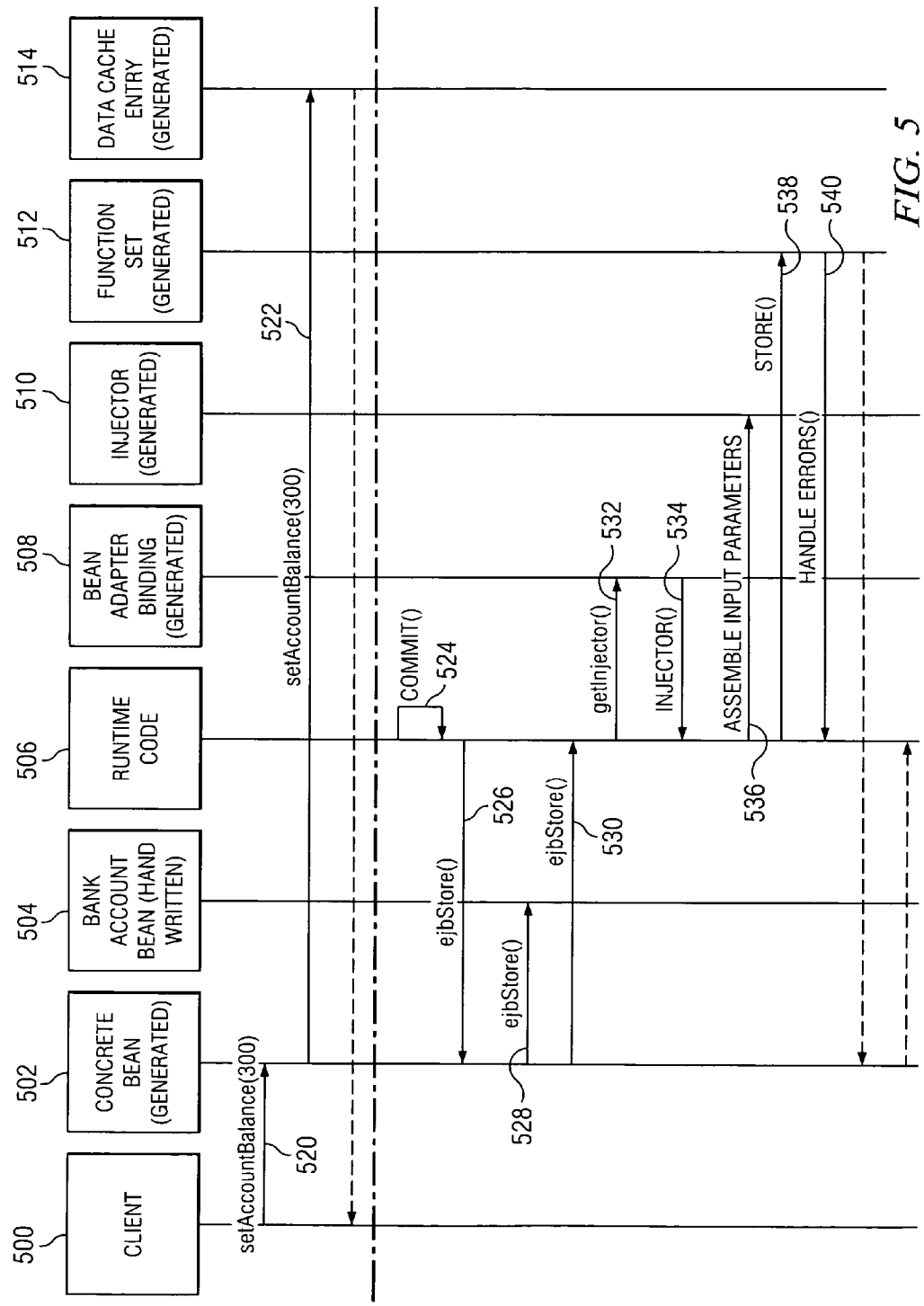
FIG. 5 is a diagram illustrating flow control for updating a bean using a support architecture in accordance with a preferred embodiment of the present invention.

Turning now to FIG. 5, a diagram illustrating flow control for updating a bean using a support architecture is depicted in accordance with a preferred embodiment of the present invention. The flow illustrate in FIG. 5 is implemented using a container managed persistence entity bean support architecture such as the one depicted in FIG. 3.

As illustrated in FIG. 5, when client 500 performs an update operation, such as setting the account balance of the bank account bean to 300, client 500 performs this update operation by invoking 'setAccountBalance' method of concrete bean 502 and passes in a value of 300 (call 520). Concrete bean 502 has a reference to data cache entry 514, which was returned from the extractor. Concrete bean 502 then calls the 'setAccountBalance' method for data cache entry 514 with a parameter value of 300 (call 522). Call 522 is used to store the value 300 in the private attribute of data cache entry 514. Control is then returned to client 500.

After update operations are performed, updates during the transaction are flushed to the database by invoking the runtime transaction 'commit' method (call 524). Call 524 then invokes 'ejbstore' method of concrete bean 502, which in turns calls 'ejbstore' method in runtime code 506 (call 526). The 'ejbstore' method is defined in the EJB specification.

In this illustrative embodiment, a hand written bean, bank account bean 504, is present and inherited by concrete bean 502. Therefore, the 'ejbstore' method of bank account bean 504 is invoked by concrete bean 502 (call 528). When finished, control returns to concrete bean 502. Next, concrete bean 502 calls 'ejbstore' method in runtime code 506 (call 530).

Runtime code 506 first creates an instance of injector by invoking the 'getinjector' method of bean adaptor binding 508 (call 532). Once the injector instance 534 is created, runtime code 506 calls injector 510 to assemble input parameters 536. Runtime code 506 then calls the 'store' method in function set 512 to update the value in the database (call 538). Bean adaptor binding 508 is database specific.

If an error occurs when updating the database, runtime code 506 handles the error accordingly. If no error is encountered, control is returned to concrete bean 502, which returns to runtime code 506 to complete transaction commit method (call 524).

Figure 6:
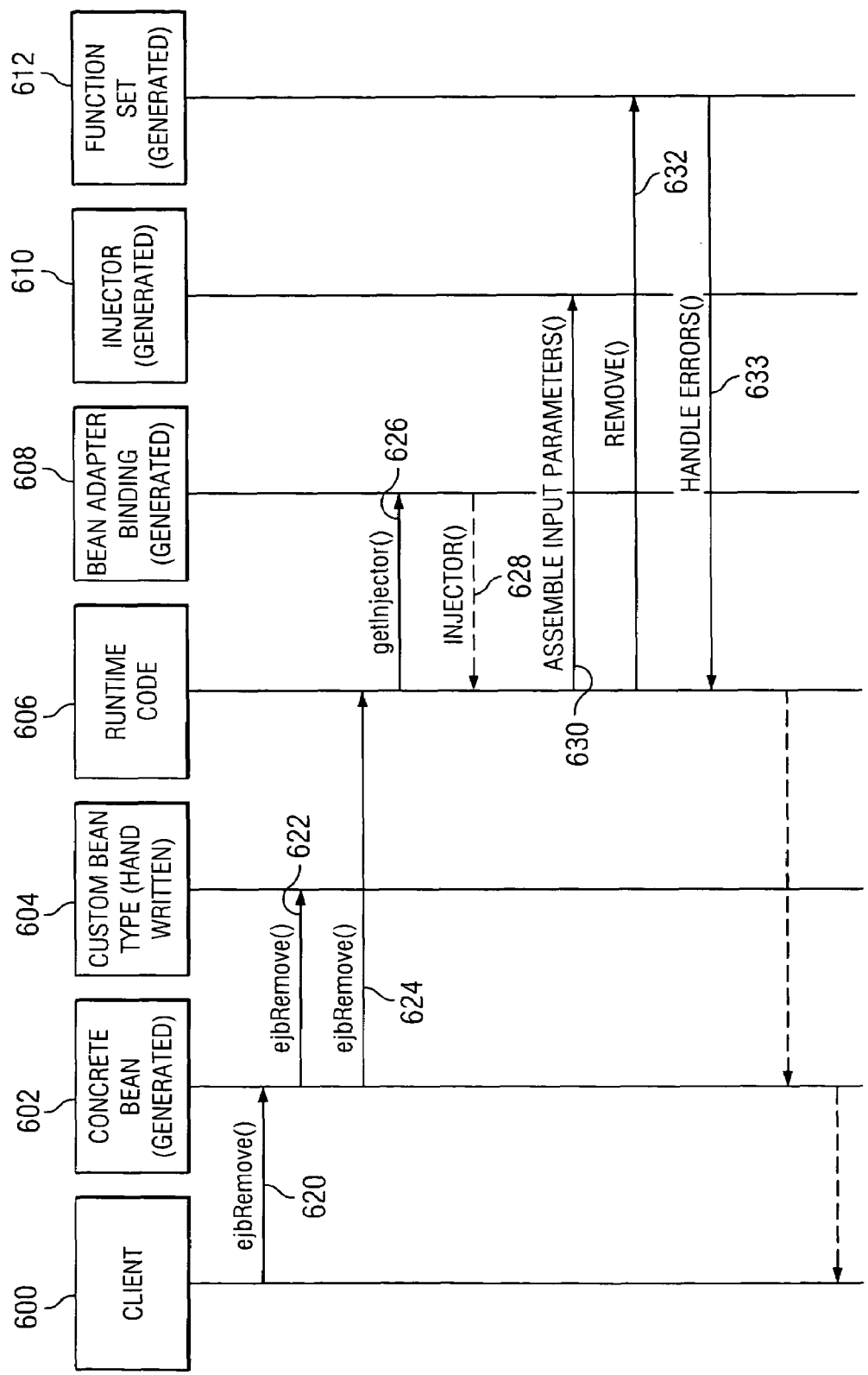
FIG. 6 is a diagram illustrating exemplary flow control for removing a bean using the support architecture in accordance with a preferred embodiment of the present invention.

Turning next to FIG. 6, a diagram illustrating exemplary flow control for removing a bean using the support architecture is depicted in accordance with a preferred embodiment of the present invention. The flow illustrated in this example may be implemented using the container managed persistence entity bean support architecture illustrated in FIG. 3.

As depicted in FIG. 6, when client 600 removes or deletes a bean, client 600 calls the 'ejbRemove' method for concrete bean 602 (call 620). Concrete bean 602 in turns calls the 'ejbRemove' method in custom bean type 604 (call 622). Concrete bean 602 then calls the 'ejbRemove' method in runtime code 606. The 'ejbRemove' method is specified in the EJB Specification as a required method.

Next, runtime code 606 creates an injector instance by invoking 'getinjector' method of bean adaptor binding 608 (call 626) and obtains injector instance 628 as a response. Runtime code 606 then calls injector 610 to assemble input parameters (call 630). Runtime code 606 then calls the 'remove' method in function set 612 to delete the bean data in the database (call 632).

If an error occurs when updating the database, runtime code 606 handles the error accordingly. If no error is encountered, control is returned to concrete bean 602, which returns to client 600.

Figure 7:
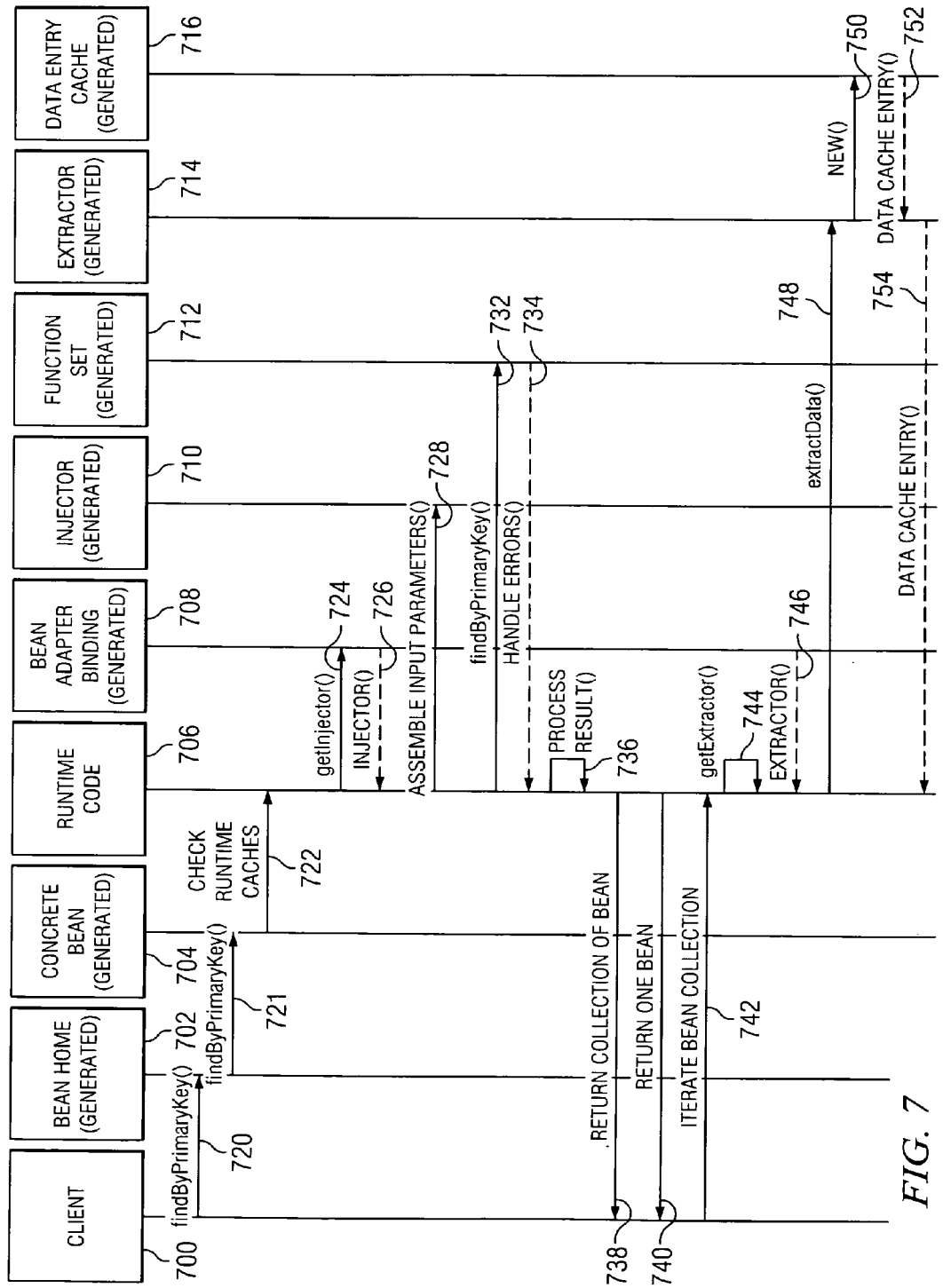
FIG. 7 is a diagram illustrating exemplary flow of control for finding a bean or a set of beans using the support architecture in accordance with a preferred embodiment of the present invention.

Turning next to FIG. 7, a diagram illustrating exemplary flow of control for finding a bean or a set of beans using the support architecture is depicted in accordance with a preferred embodiment of the present invention. The flow illustrated in this example may be implemented using the container managed persistence entity bean support architecture illustrated in FIG. 3.

As depicted in FIG. 7, client 700 finds a bean by first invoking the 'findByPrimaryKey' method in bean home 702 (call 720), which calls 'findByPrimaryKey' on concrete bean 704. The 'findByPrimaryKey' method is one of many finder methods provided by concrete bean 702 and it is according to the EJB specification as provided by the bean provider. The specification only requires one finder method, findByPrimaryKey, others are optional and specific to the bean type. Concrete bean 704 then calls runtime code 706 to check runtime caches (call 722) and, if the data is not found in the cache, to obtain the data from the database. If data is not found in the cache, runtime code 706 obtains an instance of injector 726 by invoking the 'getinjector' method (call 724) of bean adapter binding 708. Runtime code 706 then calls injector 710 to assemble input parameters (call 728).

Next, runtime code 706 calls the 'findByPrimaryKey' method in function set 712, which finds the bean data in the database (call 732). If an error codes, runtime code 706 handles the error accordingly 734. Otherwise, runtime code 706 processes the results initially, such as type checking the values (call 736), and returns a collection of beans found in the database to concrete bean 704 (call 738). For findByPrimaryKey, and other finders that return zero or one bean, runtime code 706 iterates the "collection of one" and returns the one bean via its key to concrete bean 704. Concrete bean 704 then returns the one bean to client 700 (call 740). For finders that return zero or one bean, runtime code 706 returns the collection of beans to concrete bean 704, which returns the collection of beans to client 700.

As the client 700 (or concrete bean 704) iterates through the collection of beans found from the database, runtime code 706 performs iterations (call 742) and processes the found bean by first creating an extractor instance 746 by invoking 'getExtractor' method in bean adaptor binding 708 (call 744). Then, runtime code 706 extracts the bean data by invoking the 'extractData' method in extractor 714 (call 748). The extractor, similar to the bean adaptor binding, is specific to the database. Extractor 714 creates an instance of data cache entry 752 using 'new' method (call 750) and extracts the bean data to be stored in data cache entry 716. Data cache entry 716 is specific to a bean type, since runtime code 706 requires knowledge of the specific bean type in order to store bean data needed by concrete bean 704.

Once the collection of beans found is not longer in use, runtime code 706 cleans up and frees resources in the database.

With reference to FIG. 8, a diagram illustrating an example implementation of a generated method for concrete bean is depicted in accordance with a preferred embodiment of the present invention. As can be seen, code 800 is an example implementation of "findByPrimaryKey( )" method for a remote home class. As can be seen in code 800, the presence of the return type "BankKey", the primary key type for a bank bean, makes it more efficient to generate this code rather than to write runtime code. Using runtime code would require the use of introspection to cast an object to the class with the given String class name "bankKey". On the other hand, we would not want to generate code to open a connection to the data store and actually perform the query using the integer argument as input. This sort of code logic is just as efficient when done using runtime code and is more flexibly changed and enhanced in runtime code rather than placing this code within generated code for the CMP bean. This same logic is applied in deciding whether other types of code should be generated or kept as runtime code.

Turning next to FIG. 9, a diagram illustrating an example implementation of a generated concrete bean is depicted in accordance with a preferred embodiment of the present invention. As shown in FIG. 9, concrete bean is represented by class ConcreteCustomerEJB_4fb7b8ee 900. ConcreteCustomerEJB_4fb7b8ee 900 is generated and it inherits from class CustomerBean 902. CustomerBean 902 is a handwritten class that allows application programmers to add logic to the EJB methods. A private attribute instanceExtension 904 is included in ConcreteCustomerEJB_4fb7b8ee 900 as runtime code where common runtime behavior is delegated. Delegation is used when inheritance cannot be used.

ConcreteCustomerEJB_4fb7b8ee 900 fulfills the required EJB Specification by providing required EJB methods for bean lifecycle management. In this example, ConcreteCustomerEJB_4fb7b8ee 900 includes four EJB methods: ejbRemove 906, ejbStore 908, ejbFindByPrimaryKey 910, and ejbCreate 912. In each of these methods, the inherited CustomerBean 902 method is called prior to the runtime instanceExtension 904 method. For example, ejbStore 907 method invokes inherited ejbStore method 920 prior to invoking ejbStore of instanceExtension 922. This allows added logic to be performed prior to passing control to runtime.

Turning now to FIG. 10, a diagram illustrating an example implementation of a generated bean adaptor binding is depicted in accordance with a preferred embodiment of the present invention. As shown in FIG. 10, in this example implementation, bean adaptor binding is represented by CustomerAdaptorBinding class 1002. CustomerAdaptorBinding class 1002 includes three methods: getExtractor 1004, getinjector 1008, and createDataAccessSpecs 1010.

GetExtractor 1004 method returns a CustomerExtractor instance specific to the database 1006. GetInjector 1006 method returns an injector instance that implements concrete customer bean's injector specific to a database. In this example, the database is represented by DB2UDBNT_V72_1 1008.

The createDataAccessSpecs 1010 method returns a collection of data access specification definition. This definition allows data from concrete customer bean to be packaged in a format that runtime data access framework can handle. The data access framework is a runtime mechanism provided with WebSphere Application Server. In this example, block 1012 defines the specification definition of required EJB method 'create' and returns a collection named 'result' 1014 containing this data access specification and others.

Turning now to FIG. 11, a diagram illustrating an example implementation of a generated injector is depicted in accordance with a preferred embodiment of the present invention. As shown in FIG. 11, in this example implementation, the injector is represented by CustomerInjectorImpl 1100 class. CustomerInjectorImpl 1100 class includes required EJB methods for bean lifecycle management, such as ejbCreate 1102, ejbStore 1104, ejbRemove 1106, and ejbFindByPrimaryKey 1108. These methods convert input parameters for the like-named concrete bean methods from the concrete bean format to an indexRecord format that is used by the function set. In this example, ejbCreate 1102 converts concrete bean's name 1110 and id 1112 into indexRecord data columns 0 and Turning now to FIG. 12, a diagram illustrating an example implementation of a generated extractor is depicted in accordance with a preferred embodiment of the present invention. As shown in FIG. 12, the extractor is represented by CustomerExtractor class 1200. CustomerExtractor 1200 includes an extractData method 1202, which extracts bean data from the database and converts the data into entry data stored in data cache entry. In this example, data cache entry is represented by CustomerCacheEntryImpl class 1204, which is a subclass of data cache entry for the customer bean type. CustomerCacheEntryImpl 1204 is specific to the database.

In addition to extractData 1202, CustomerExtractor 1200 also includes an extractPrimaryKey method 1206 that returns the primary key of the bean data.

Turning now to FIG. 13, a diagram illustrating an example implementation of a generated data cache entry is depicted in accordance with a preferred embodiment of the present invention. As shown in FIG. 13, data cache entry is represented by CustomerCacheEntryImpl class 1300. CustomerCacheEntryImpl 1300 holds data for a specific customer bean instance in the form of Java primitive values and object references. In this example, CustomerCacheEntryImpl 1300 includes two get methods, getName 1304 and getid 1306, and two set methods, setDataForName 1308 and setDataForID 1310. The name and id is held by the customer concrete bean at runtime instead of the database for manipulation by the client.

With reference to FIG. 14A, a diagram illustrating an example implementation of a generated function set is depicted in accordance with a preferred embodiment of the present invention. As shown in FIG. 14A, function set is represented by CustomerFunctionSet 1400. CustomerFunctionSet 1400 is an interface that interacts directly with the database. Therefore, CustomerFunctionSet 1400 is database specific. In this example, CustomerFunctionSet 1400 includes a create method 1402 that takes the data in an indexRecord packaged by the injector as described in FIG. 11 and prepares an SQL statement to be inserted into the database. CustomerFunctionSet 1400 also includes a private attribute functionHash 1404 in a hash map format. FunctionHash 1404 is described in further details in FIG. 14B.

With reference to FIG. 14B, a diagram illustrating an example implementation of generated function set is depicted in accordance with a preferred embodiment of the present invention. FIG. 14B is a continuation of CustomerFunctionSet class 1400 described in FIG. 14A. As shown in FIG. 14B, functionHash 1406 holds keys to a set of methods representing operations perform by the database, such as, create, store, remove, and findByPrimaryKey, etc. The execute method 1410 is called after the injector has assembled the input parameters. Execute method 1410 identifies the operation defined by the data access specification definition and invokes appropriate methods based on the value stored in functionHash 1406.

Thus, the present invention provides an improved method, apparatus, and computer instructions for supporting CMP beans. This support is provided through a CMP entity bean support architecture that includes components for handling CMP entity beans. The architecture provides a balance between generated code and runtime code. This balance allows for a smaller foot print in the size of code needed to CMP beans with flexibility and efficiency. The runtime component may be shared by many different beans.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A container managed persistence entity bean system in a data processing system, comprising:

runtime code, wherein the runtime code provides functions to a plurality of bean types;

a concrete bean, wherein the concrete bean receives requests from a client to locate an instance of a container managed persistence bean and, in response to receiving the requests from the client, locates the instance of the container managed persistence bean by calling the runtime code, wherein the concrete bean calls inherited bean specific functions prior to calling the runtime code, the inherited beam specific functions being written by a specific bean type provider, and wherein the concrete bean locates a specific container managed persistence bean instance by creating a container managed persistence bean associated with a bean type, but not associated with a specific bean instance;

an injector, wherein the injector converts input parameters from a format used by the concrete bean into a formatted input for use in accessing a backend when called by the runtime code;

a bean adapter binding, wherein the bean adapter binding provides access to bean specific information for a particular container managed persistence bean by providing at least one of the injector, an extractor, and bean method information to the runtime code in response to a call from the runtime code for access, wherein the extractor receives data for a given instance of a container managed persistence bean from the backend and formats data into a format used by the concrete bean;

a function set, wherein the function set provides access to the backend in response to being called by the runtime code, wherein the function set uses the formatted input created by the injector to access the backend by executing beam-specific and backend specific data access logic; and a data cache, wherein the data cache receives the data from the extractor and holds the data received by the extractor, wherein the data is data for a given instance of a container managed persistence bean, wherein the data includes at least one of a Java primitive and an object reference, and wherein the backend is a data storage system.

* * * * *